United States Patent [19]

Parsi

[11] Patent Number: 6,152,101
[45] Date of Patent: Nov. 28, 2000

[54] PISTON FOR AN INTERNAL COMBUSTION ENGINE HAVING A RE-ENTRANT TYPE COMBUSTION BOWL

[75] Inventor: Mohammad Parsi, London, United Kingdom

[73] Assignee: Perkins Engines Company Limited, Peterborough, United Kingdom

[21] Appl. No.: 09/331,085

[22] PCT Filed: Sep. 19, 1997

[86] PCT No.: PCT/GB97/02567

§ 371 Date: Jun. 14, 1999

§ 102(e) Date: Jun. 14, 1999

[87] PCT Pub. No.: WO98/27329

PCT Pub. Date: Jun. 25, 1998

[30] Foreign Application Priority Data

Dec. 16, 1996 [GB] United Kingdom .................... 9626096
Jun. 4, 1997 [GB] United Kingdom .................... 9711567

[51] Int. Cl.[7] ................................ F02B 23/06; F02F 3/26
[52] U.S. Cl. .................... 123/276; 123/193.6; 123/279
[58] Field of Search ................................ 123/193.6, 276, 123/279

[56] References Cited

U.S. PATENT DOCUMENTS 4,207,843  6/1980  List et al. .................... 123/261

FOREIGN PATENT DOCUMENTS

| 0 172 253 | 2/1986 | European Pat. Off. . |
| 0 656 466 | 6/1995 | European Pat. Off. . |
| 0 295 520 | 12/1998 | European Pat. Off. . |
| 1805043 | 5/1970 | Germany .................... 123/276 |

*Primary Examiner*—Tony M. Argenbright
*Attorney, Agent, or Firm*—Alan J. Hickman

[57] ABSTRACT

A piston for an internal combustion engine has a re-entrant type combustion bowl. The combustion bowl has two re-entrant volumes in fluid communication and cascaded with respect to the longitudinal axis of the piston. The cascaded re-entrant volumes enhance gas velocities within the combustion bowl to improve fuel combustion.

12 Claims, 3 Drawing Sheets

PISTON FOR AN INTERNAL COMBUSTION ENGINE HAVING A RE-ENTRANT TYPE COMBUSTION BOWL

BACKGROUND OF THE INVENTION

1. Field of the Invention

The present invention relates to an internal combustion (i.c.) engine, particularly a compression ignition engine, having a re-entrant type combustion bowl.

2. Description of the Related Art

In view of the increasing environmental and legislative pressures world-wide to improve i.c. engine exhaust emissions, engine manufacturers are now focusing their attention on the development of new engines to achieve substantial reductions in emissions without compromising combustion efficiency or specific fuel consumption. An important requirement for clean combustion in an i.c. engine is the enhancement of gas velocities within the engine cylinder. Swirl and squish influenced by combustion chamber shape play a significant role in satisfying this requirement around top-dead-centre (TDC), particularly in diesel fuelled engines. In general, comustion chamber shape is a dominant factor governing the structure of turbulence around TDC. In-cylinder turbulence enhancement in diesel fuelled engines using unique combustion chamber shapes can be highly beneficial in terms of improving air/fuel mixing and combustion processes, and is an important goal to achieve.

OBJECTS AND SUMMARY OF THE INVENTION

It is an object of the present invention to provide a piston for an internal combustion engine, particularly a compression ignition engine, which has the capability to produce high gas velocities within a combustion chamber over a critical period of engine cycle around TDC, particularly during the early stages of the power stroke.

According to a first aspect of the present invention, there is provided a piston for an internal combustion engine having a combustion bowl formed contiguous to a face of a crown of the piston, said combustion bowl having wall means defining a first volume and a second volume, said second volume being in communication with said first volume and being located generally axially to the piston below the first volume, wherein a smallest diameter of a throat portion connecting said first and second volumes is smaller than the greatest diameter of the first volume and is smaller than the greatest diameter of the second volume and the greatest diameter of the first volume is larger than the diameter of a mouth of the combustion bowl, and a portion of the wall means defining the first volume adjacent to the throat portion is at least parallel with or angled upwardly towards the face of the piston crown when viewed through the combustion bowl mouth.

The greatest diameter of the second volume may also be larger than the diameter of the combustion bowl mouth.

Alternatively, the greatest diameter of the second volume may be smaller than the diameter of the combustion bowl mouth.

The greatest diameter of the second volume may be equal to the greatest diameter of the first volume.

Alternatively, the greatest diameter of the second volume may be smaller than the greatest diameter of the first volume.

Alternatively also, the greatest diameter of the second volume may be larger than the greatest diameter of the first volume.

The axial depth of the second volume may be equal to the axial depth of the first volume.

Alternatively, the axial depth of the second volume may be smaller than the axial depth of the first volume.

Alternatively also, the axial depth of the second volume may be larger than the axial depth of the first volume.

The first and second volumes may be arranged to be co-axial.

Alternatively, the second volume may be radially offset with respect to the first volume.

At least the first volume may be arranged to be co-axial with the piston.

The first and second volumes may each be rotationally symmetrical.

The ratio of the diameter of the combustion bowl mouth to the diameter of the piston crown may be in the range of 0.15 to 0.85, but is preferably in the range of 0.3 to 0.6

The ratio of the smallest diameter of the throat portion to the greatest diameter of the second volume may be in the range of 0.4 to 0.9, but is preferably in the range of 0.5 to 0.9.

The ratio of the diameter of the combustion bowl mouth to the greatest diameter of the first volume may be in the range of 0.4 to 0.9, but is preferably in the range of 0.6 to 0.9.

The ratio of the diameter of the combustion bowl mouth to the smallest diameter of the throat portion may be in the range of 0.4 to 4.0, but is preferably in the range of 0.7 to 3.2

The ratio of the smallest diameter of the throat portion to the greatest diameter of the first volume may be in the range of 0.15 to 0.85, but is preferably in the range of 0.2 to 0.7

The ratio of the axial depth of the first volume to the axial depth of the second volume may be in the range of 0.4 to 3.6, but is preferably in the range of 0.6 to 2.5.

The angle subtended by a first sloping portion of the combustion bowl wall means defining the first volume with respect to the piston crown face may be in the range of 10° to 85°, but is preferably in the range of 40° to 80°.

The inner peripheral edge of the combustion bowl mouth may be truncated to provide an annular lip around the combustion bowl mouth of small axial depth.

The lip(s) around the combustion bowl mouth and/or the throat portion may be curved.

According to a second aspect of the present invention, there is provided an i.c. engine including a piston in accordance with the twenty-two preceding paragraphs.

BRIEF DESCRIPTION OF THE DRAWINGS

The foregoing and further features of the present invention will be more readily understood from the following description of preferred embodiments, by way of example thereof, with reference to the accompanying drawings of which.

DESCRIPTION OF THE PREFERRED EMBODIMENTS

Figure 1:
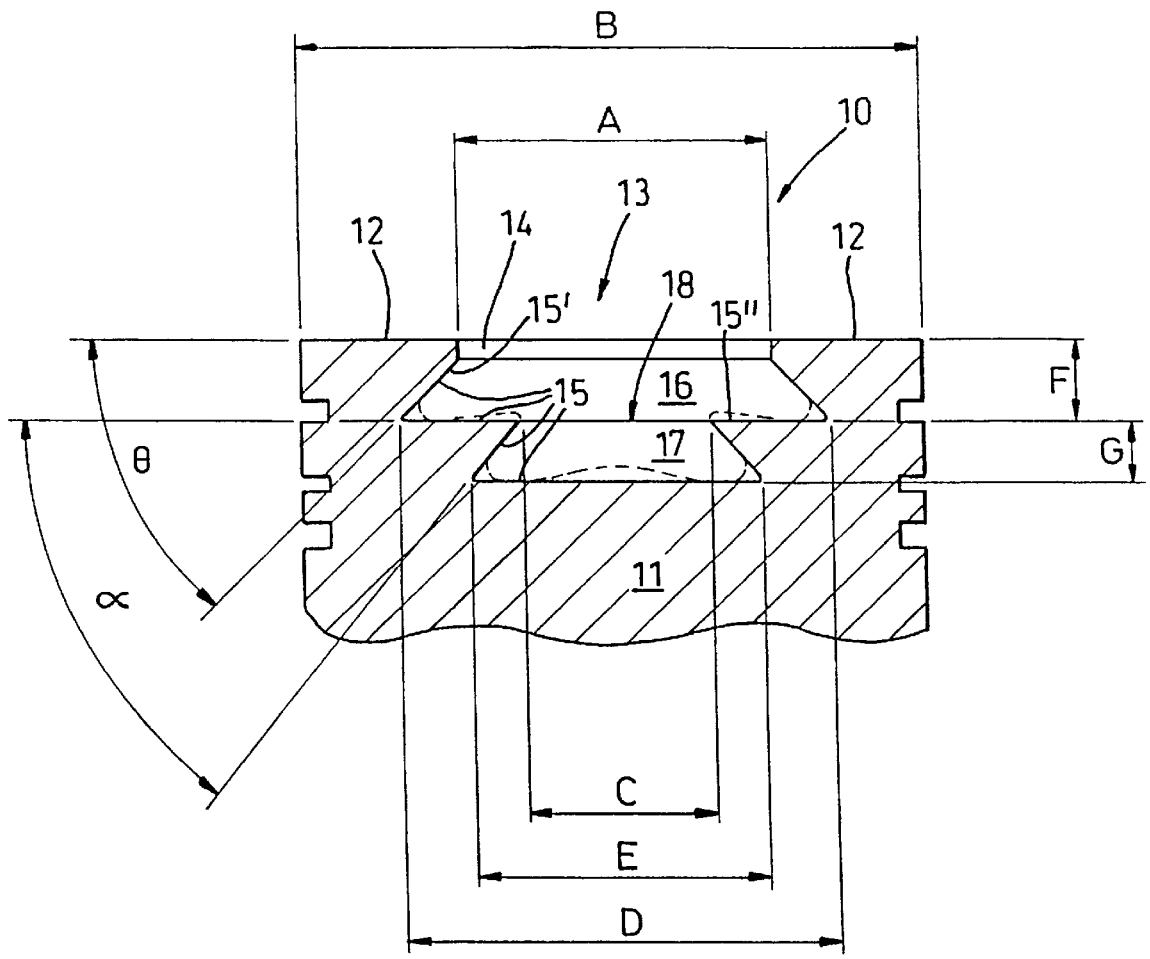
FIG. 1 is a cross-sectional elevation of an upper portion of the crown of an internal combustion piston in accordance with a first embodiment of the present invention.

A piston 10 in accordance with a first embodiment (FIG. 1) of the present invention has a piston crown 11, contiguous to a face 12 of which is formed a combustion bowl 13. The combustion bowl 13 is of a re-entrant type having a greatest diameter larger than the diameter of a combustion bowl mouth 14. However, the novel feature of the combustion bowl 13 is that it comprises wall means 15 defining first and second cascaded re-entrant volumes (16,17) with the second volume (17) being located axially below the first volume 16 with respect to the piston 10 and a portion 15" of the wall means 15 adjacent to a throat portion 17 being coplanar with the face 12 of the piston crown 11. The first and second volumes (16,17) are arranged co-axially with the piston 10 and are rotationally symmetrical. The first and second volumes (16,17) are in fluid communication via the throat portion 18. However, the volumes need not be symmetrical and need not be co-axial with each other or with the piston, but the first and second volumes (16,17) must be in fluid communication.

The dimensions of the combustion bowl 13 denoted by the letters A through to G in FIG. 1 are carefully chosen to provide limits beyond which turbulence produced by the in-cylinder squish effect is dramatically reduced, resulting in severe combustion deterioration or increased so much that heat transfer rates are affected, resulting in a deterioration of specific fuel consumption. Ratios of said dimensions are as indicated in the table below.

| | |
|---|---|
| A/D | Range 0.4 to 0.9, preferably 0.6 to 0.9 |
| C/E | Range 0.4 to 0.9, preferably 0.5 to 0.9 |
| A/B | Range 0.15 to 0.85, preferably 0.3 to 0.6 |
| C/D | Range 0.15 to 0.85, preferably 0.2 to 0.7 |
| A/C | Range 0.4, to 4.0, preferably 0.7 to 3.2 |
| F/G | Range 0.4 to 3.6; preferably 0.6 to 2.5 |

The re-entrant angle $\theta$, ie, the angle subtended by a first sloping portion 15' of the wall means 15 defining the first volume 16 with respect to the piston crown face 12 should be less than 90° and is preferably in the range of 40° to 80°. However, it is preferred that the angle is quite pronounced and is approximately 50°. The re-entrant angle $\alpha$ for the second volume 17 should be of a similar value although it may not be exactly equal to that of the first volume 16.

It will be noted that the mouth 14 of the combustion bowl 13 is truncated to provide an inner peripheral lip of small axial depth. This is desirable since the wall means 15 defining the mouth 14 of the combustion bowl 13 is subjected, in use, to high stress and temperature levels and, if the combustion bowl mouth 14 were not truncated in the manner shown, there is a danger of failure of the wall means 15 at the combustion bowl mouth 14.

The combustion bowl shape shown in solid line is generally angular and thus pockets may be created at the outer extremities of the first and second volumes (16,17) in which there is little turbulence and poor fuel combustion. These pockets are therefore effectively redundant and thus a combustion bowl shape indicated by the phantom line in FIG. 1 is preferred. The combustion bowl shape thus defined has a more rounded shape but still retains the cascaded re-entrant first and second volumes (16,17). However, the portion 15" of the wall means 15 is, in this case, arranged to extend upwardly towards the interior of the first volume 16 with respect to the piston crown face 12. The rounding of the angular portions of the first and second volumes reduces the possibility of stress fractures occurring in the piston crown 11 and improves fluid motion within the first and second volumes. The base of the second volume 17 is shown in broken outline to be convex but, dependent on other design considerations, may be made to be concave or any suitable shape.

Figure 2:
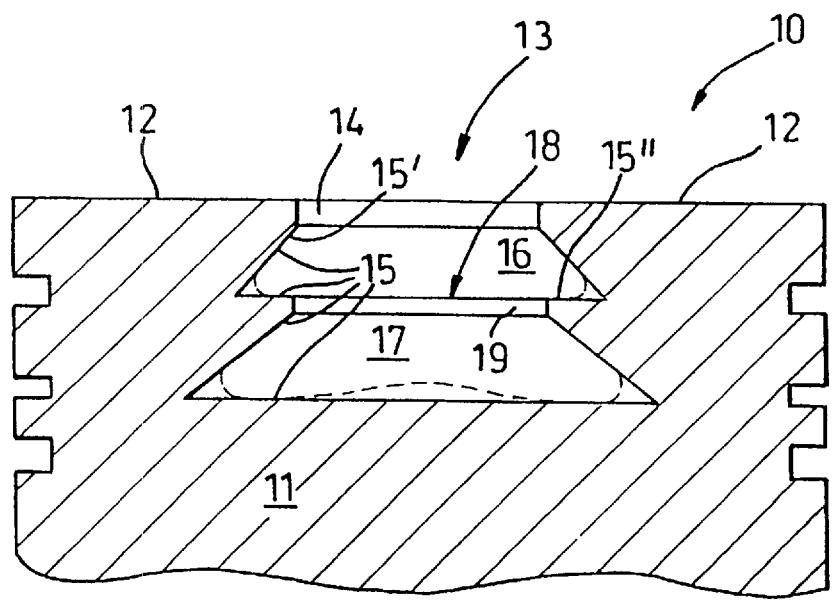
FIG. 2 is a cross-sectional elevation of an upper portion of the crown of an internal combustion piston in accordance with a second embodiment of the present invention.

FIG. 2 shows a cross-sectional view of a piston crown 11 illustrating a second embodiment of the invention. This embodiment is generally similar to that illustrated in FIG. 1 and like numerals are therefore used to denote like parts. The major difference is that the second volume 17 has a greatest diameter larger than the greatest diameter of the first volume 16 and has an axial depth that is at least equal to the axial depth of said first volume 16. In addition, the throat portion 18 connecting the first and second volumes (16,17) has, in a like manner to the combustion bowl mouth 14, an inner lip 19 of small axial depth. Once again, a preferred shape of combustion bowl is illustrated by a phantom line.

Figure 3:
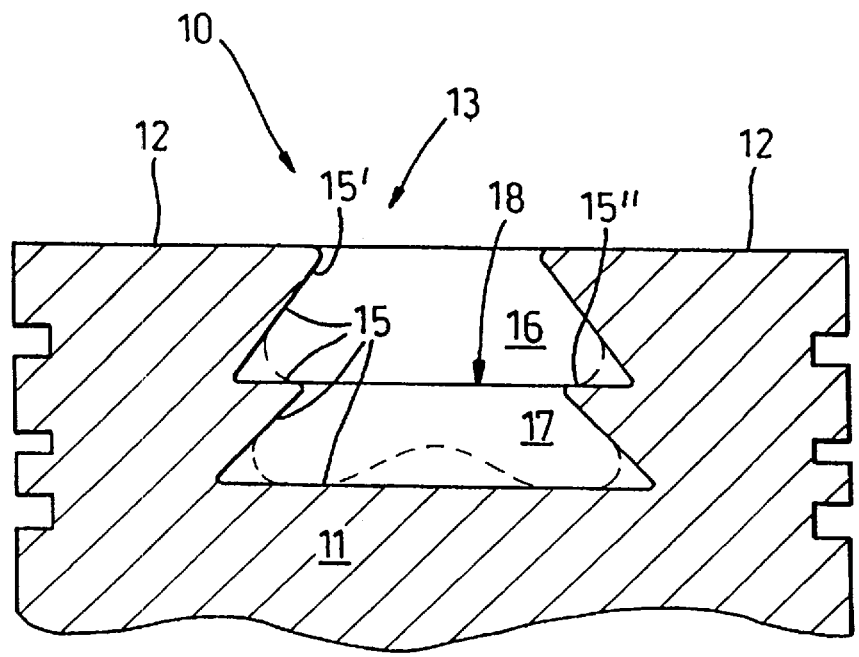
FIG. 3 is a cross-sectional elevation of an upper portion of the crown of an internal combustion piston in accordance with a third embodiment of the present invention.

FIG. 3 illustrates a cross-sectional view of a piston crown 11 showing a third embodiment of the present invention. This differs from the first and second embodiments in that the preferred shape of the combustion bowl 13 shown by a phantom line is more roundly pronounced than those shown in FIGS. 1 and 2 with the radii of corresponding curved portions being greater than those illustrated in FIGS. 1 and 2.

Figure 4:
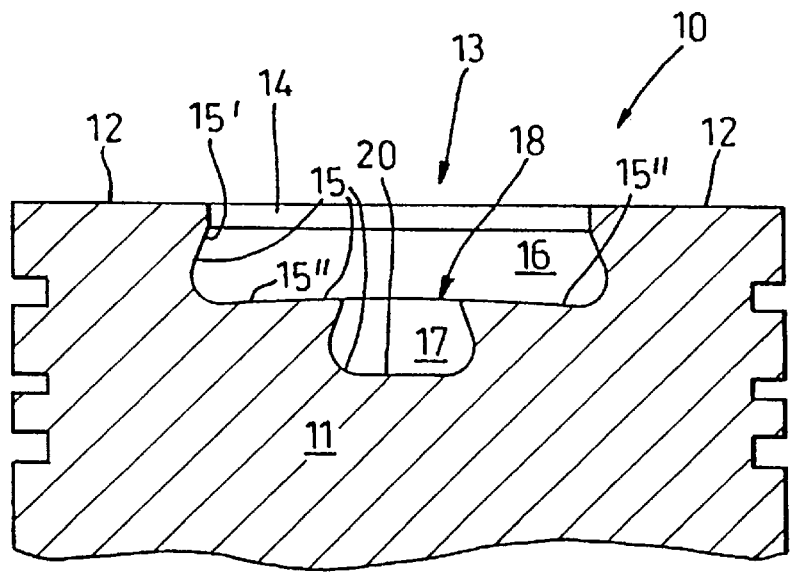
FIG. 4 is a cross-sectional elevation of an upper portion of the crown of an internal combustion piston in accordance with a fourth embodiment of the present invention.

FIG. 4 illustrates a cross-sectional view of a piston crown 11 showing a fourth embodiment of the present invention. In this embodiment, the second volume 17 is considerably smaller than the first volume and the wall means 15 at the base 20 of the second volume 17 is generally flat. A more significant difference, however, between this embodiment and the first and second embodiments, particularly, is that the re-entrant angle $\theta$ of the first volume is relatively large being about 70°. The re-entrant angle is larger than considered necessary to achieve optimum in-cylinder gas velocity enhancement, but is a compromise between that considered necessary and a value which takes account of practical considerations such as piston manufacture, tolerance of piston material to thermal and mechanical stresses, for example.

Figure 5:
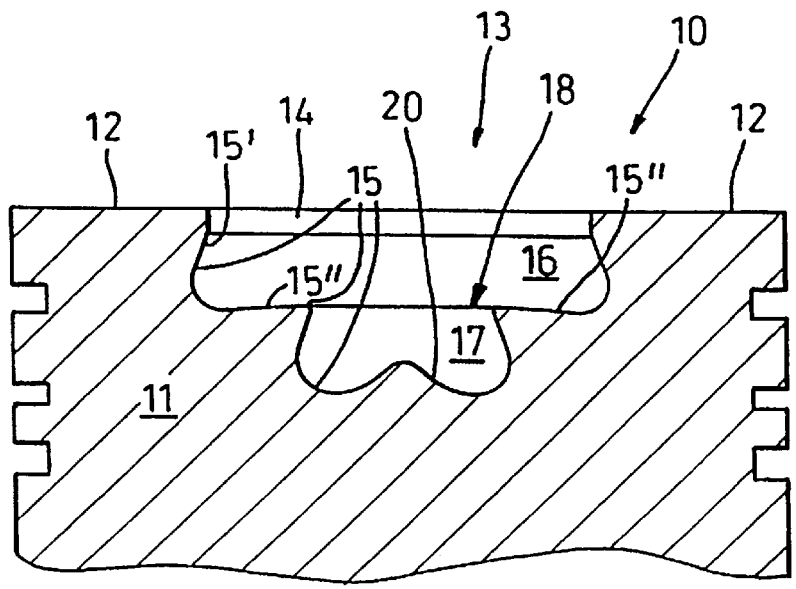
FIG. 5 is a cross-sectional elevation of an upper portion of the crown of an internal combustion piston in accordance with a fifth embodiment of the present invention.

FIG. 5 illustrates a cross-sectional view of a piston crown 11 in accordance with a fifth embodiment of the invention. This is generally similar to the embodiment of FIG. 4 with the exception that the second volume 17 is slightly larger than that of the fourth embodiment. More significantly, the base 20 the second volume is shaped to further enhance fluid motion within the combustion bowl 13, said base 20 having a raised central portion.

The shape of the lip around the combustion bowl mouth can also be important to enhancing combustion chamber gas velocities and should be designed by calculation or experimentation to optimise its effect in the enhancement process. The lip could, for example, be straight-sided (FIGS. 1, 2, 4 and 5) or outwardly curved (FIG. 3).

An essential feature of the novel combustion bowl shape of the embodiments of the present invention is that the maximum diameter of the first volume is larger than the diameter of the combustion bowl mouth and a smallest diameter of a throat portion connecting the first and second volumes for fluid communication therebetween, the maximum diameter of the second volume is also larger than the smallest diameter of the throat portion and a portion of the wall means defining the first volume adjacent to the throat portion is at least parallel with or angled upwardly towards the face of the piston crown when viewed through the combustion bowl mouth. The purpose of the cascaded re-entrant volumes of the combustion bowl is to utilise the squish effect during the compression and expansion strokes of an engine to increase in-cylinder air turbulence around TDC. The combustion bowl, together with surrounding walls (not shown) of an engine cylinder defines a combustion chamber (not shown) for combustion of fuel. The squishing of fluid in the cylinder between the flat face of the piston crown surrounding the combustion bowl mouth and the walls of the cylinder causes compression of said fluid and causes it to flow initially into the first volume and onward into the second volume. The re-entrant shape of said volumes intensifies the level of air turbulence around TDC and well into the expansion stroke. Fuel introduced into the combustion chamber is subsequently rapidly evaporated and more evenly dispersed throughout the combustion chamber. Also, due to increased levels of in-cylinder air turbulence, the fuel mixes faster with air than is the case with conventional combustion bowl topographies and hence results in more efficient combustion of said fuel. This is particularly relevant to direct injection compression ignition engines in which the injection of fuel at high pressure causes it to atomise ready for dispersion by turbulence of fluid in the combustion chamber.

A direct injection diesel engine combustion system including pistons in accordance with the present invention shows a greater tolerance to retarded fuel injection than conventional systems due to the very high levels of in-cylinder turbulence after TDC. This results in a substantial reduction in nitrous oxide ($NO_x$) emissions without suffering the normal tradeoff between $NO_x$ and smoke formation. In fact, fuel injection can be retarded well beyond TDC by up to 9° of crankshaft angle. This is desirable since both $NO_x$ and smoke formation decrease with retarded injection timing. In addition, the system, despite delayed injection timing resulting in improved $NO_x$ and smoke emissions, has little or no effect on specific fuel consumption or engine torque.

It will be understood that the five embodiments illustrated by FIGS. 1 to 5, respectively merely illustrate examples of pistons in accordance with the present invention but that many other variations in combustion bowl shape will fall within the scope of the present invention, the shapes of such combustion bowls being in part dictated by design considerations such as the positioning of fuel injectors and cylinder head ports and valves. Essentially, however, such shapes will comprise cascaded re-entrant volumes. It is envisaged that the combustion bowl of a piston in accordance with the invention will not be limited to only two cascaded volumes but may comprise three or more such cascaded volumes.

What is claimed is:

1. A piston for an internal combustion engine, comprising:
    a combustion bowl formed contiguous to a face of a crown of the piston, said combustion bowl having a wall defining a first volume and a second volume, said second volume being in communication with said first volume and being located generally axially to the piston below the first volume;
    a smallest diameter of a throat portion connecting said first and second volumes is smaller than a greatest diameter of the first volume and is smaller than a greatest diameter of the second volume, said greatest diameter of the first volume is larger than a diameter of a mouth of the combustion bowl, and the greatest diameter of the second volume is smaller than the diameter of the combustion bowl mouth;
    a portion of the wall defining the first volume adjacent to the throat portion is at least one of parallel with and angled upwardly towards the face of the piston crown when viewed through the combustion bowl mouth.

2. A piston as claimed in claim 1, wherein the greatest diameter of the second volume is equal to the greatest diameter of the first volume.

3. A piston as claimed in claim 1, wherein the axial depth of the second volume is larger than the axial depth of the first volume.

4. A piston as claimed in claim 1, wherein the first and second volumes are arranged to be co-axial.

5. A piston as claimed in claim 1, wherein at least the first volume is arranged to be co-axial with the piston.

6. A piston as claimed in claim 1, wherein the first and second volumes are each rotationally symmetrical.

7. A piston as claimed in claim 1, wherein a lip disposed around at least one of the combustion bowl mouth and the throat portion is curved.

8. A piston for an internal combustion engine, comprising:
    a combustion bowl formed contiguous to a face of a crown of the piston, said combustion bowl having a wall defining a first volume and a second volume, said second volume being in communication with said first volume and being located generally axially to the piston below the first volume;
    a smallest diameter of a throat portion connecting said first and second volumes is smaller than a greatest diameter of the first volume and is smaller than a greatest diameter of the second volume, said greatest diameter of the first volume is larger than a diameter of a mouth of the combustion bowl, and the greatest diameter of the second volume is smaller than the greatest diameter of the first volume; and
    a portion of the wall defining the first volume adjacent to the throat portion is at least one of parallel with and angled upwardly towards the face of the piston crown when viewed through the combustion bowl mouth.

9. A piston for an internal combustion engine, comprising:
    a combustion bowl formed contiguous to a face of a crown of the piston, said combustion bowl having a wall defining a first volume and a second volume, said second volume being in communication with said first volume and being located generally axially to the piston below the first volume;
    a smallest diameter of a throat portion connecting said first and second volumes is smaller than a greatest diameter of the first volume and is smaller than a greatest diameter of the second volume, said greatest diameter of the first volume is larger than a diameter of a mouth of the combustion bowl, and an axial depth of the second volume is equal to an axial depth of the first volume; and
    a portion of the wall defining the first volume adjacent to the throat portion is at least one of parallel with and angled upwardly towards the face of the piston crown when viewed through the combustion bowl mouth.

10. A piston for an internal combustion engine; comprising:
    a combustion bowl formed contiguous to a face of a crown of the piston, said combustion bowl having a wall defining a first volume and a second volume, said second volume being in communication with said first volume and being located generally axially to the piston below the first volume;

a smallest diameter of a throat portion connecting said first and second volumes is smaller than a greatest diameter of the first volume and is smaller than a greatest diameter of the second volume, said greatest diameter of the first volume is larger than a diameter of a mouth of the combustion bowl, and an axial depth of the second volume is smaller than the an axial depth of the first volume; and a portion of the wall defining the first volume adjacent to the throat portion is at least one of parallel with and angled upwardly towards the face of the piston crown when viewed through the combustion bowl mouth.

11. A piston for an internal combustion engine, comprising:

a combustion bowl formed contiguous to a face of a crown of the piston, said combustion bowl having a wall defining a first volume and a second volume, said second volume being in communication with said first volume and being located generally axially to the piston below the first volume;

a smallest diameter of a throat portion connecting said first and second volumes is smaller than a greatest diameter of the first volume and is smaller than a greatest diameter of the second volume, said greatest diameter of the first volume is larger than a diameter of a mouth of the combustion bowl, the second volume is radially offset with respect to the first volume; and a portion of the wall defining the first volume adjacent to the throat portion is at least one of parallel with and angled upwardly towards the face of the piston crown when viewed through the combustion bowl mouth.

12. A piston for an internal combustion engine, comprising:

a combustion bowl formed contiguous to a face of a crown of the piston, said combustion bowl having a wall defining a first volume and a second volume, said second volume being in communication with said first volume and being located generally axially to the piston below the first volume;

a smallest diameter of a throat portion connecting said first and second volumes is smaller than a greatest diameter of the first volume and is smaller than a greatest diameter of the second volume, the greatest diameter of the first volume is larger than a diameter of a mouth of the combustion bowl;

an inner peripheral edge of the combustion bowl mouth is truncated to provide an annular lip around the combustion bowl mouth of small axial depth; and a portion of the wall defining the first volume adjacent to the throat portion is at least one of parallel with and angled upwardly towards the face of the piston crown when viewed through the combustion bowl mouth.

* * * * *